(12) United States Patent
Mandaric

(10) Patent No.: US 11,208,171 B2
(45) Date of Patent: Dec. 28, 2021

(54) DRIVE ASSEMBLY FOR A BICYCLE

(71) Applicant: Veselin Mandaric, San Marcos, CA (US)

(72) Inventor: Veselin Mandaric, San Marcos, CA (US)

( * ) Notice: Subject to any disclaimer, the term of this patent is extended or adjusted under 35 U.S.C. 154(b) by 525 days.

(21) Appl. No.: 16/129,727

(22) Filed: Sep. 12, 2018

(65) Prior Publication Data

US 2019/0084641 A1    Mar. 21, 2019

Related U.S. Application Data

(63) Continuation-in-part of application No. 15/711,586, filed on Sep. 21, 2017, now abandoned.

(51) Int. Cl.
| | | |
|---|---|---|
| B62K 25/02 | (2006.01) | |
| B62M 9/12 | (2006.01) | |
| B62M 9/121 | (2010.01) | |
| B60B 27/02 | (2006.01) | |
| B60B 27/04 | (2006.01) | |
| B60B 27/00 | (2006.01) | |

(52) U.S. Cl.
CPC .......... *B62K 25/02* (2013.01); *B60B 27/0052* (2013.01); *B60B 27/023* (2013.01); *B60B 27/04* (2013.01); *B62M 9/12* (2013.01); *B62M 9/121* (2013.01)

(58) Field of Classification Search
CPC ......... B62K 25/02; B62M 9/12; B62M 9/121; B62M 9/135; B60B 27/023; B60B 27/0052; B60B 27/04
USPC .................... 280/260, 261, 284, 288; 192/64
See application file for complete search history.

(56) References Cited

U.S. PATENT DOCUMENTS 4,440,414 A    4/1984  Wang
4,472,163 A    9/1984  Bottini
(Continued)

FOREIGN PATENT DOCUMENTS

EP    0191710 A2 *  8/1986  .......... B60B 27/023
FR    1388952    *  1/1965
(Continued)

OTHER PUBLICATIONS

FR2782471, translation (Year: 2000).*
FR0191710, translation (Year: 1986).*

*Primary Examiner* — Anne Marie M Boehler
(74) *Attorney, Agent, or Firm* — Calif Tervo; Palomar Patent

(57) ABSTRACT

The invention is a bicycle drive assembly and it generally includes a drive chain, a drive wheel including a hub, a frame including left and right chainstays, each having a raced bearing, a cassette assembly, and an axle assembly. The cassette assembly includes a body having an inner end rotatably mounted on the right chainstay bearing, an outer free end, and a cassette including a plurality of sprockets. Cooperative torque-transferring components transfer torque between cassette and body, body and axle, and axle and hub. A freewheel mechanism, as one of the cooperative torque-transferring components, allows the bicycle to coast. A drive axle is selectably movable axially between a riding position, wherein it is rotatably mounted on the chainstay bearings and supports and drives the wheel, and a release position wherein the wheel is removable.

2 Claims, 7 Drawing Sheets

(56) References Cited

U.S. PATENT DOCUMENTS

| | | | |
|---|---|---|---|
| 4,909,529 A * | 3/1990 | Maguire | B62M 9/12 |
| | | | 280/261 |
| 5,295,702 A | 3/1994 | Buell | |
| 5,426,997 A | 6/1995 | Brion | |
| 5,518,096 A * | 5/1996 | Lin | B60B 27/023 |
| | | | 192/64 |
| 5,964,332 A * | 10/1999 | King | B60B 27/023 |
| | | | 192/46 |
| 6,591,956 B1 * | 7/2003 | Neugent | F16D 41/30 |
| | | | 192/45.1 |
| 7,131,656 B2 | 11/2006 | Valle | |
| 7,435,197 B2 | 10/2008 | Kamada | |
| 7,753,815 B2 | 7/2010 | Saifuddin et al. | |
| 7,793,960 B2 | 9/2010 | Sherman | |
| 8,020,883 B2 | 9/2011 | Brusca | |
| 9,011,282 B2 | 4/2015 | Staples | |
| 9,051,021 B2 | 6/2015 | Bettin | |
| 9,248,700 B1 | 2/2016 | Parfitt | |
| 2002/0179394 A1 * | 12/2002 | Wu | F16D 41/36 |
| | | | 192/64 |
| 2005/0184580 A1 * | 8/2005 | Kuan | B60B 27/0005 |
| | | | 301/110.5 |
| 2008/0006500 A1 * | 1/2008 | Spahr | B60B 27/0073 |
| | | | 192/64 |
| 2012/0220402 A1 | 8/2012 | D'Aluisio | |
| 2012/0302384 A1 | 11/2012 | Braedt | |
| 2015/0197120 A1 * | 7/2015 | Chen | F16D 41/30 |
| | | | 301/110 |
| 2015/0352898 A1 * | 12/2015 | French | B60B 27/047 |
| | | | 192/64 |
| 2016/0016635 A1 | 1/2016 | Thompson | |
| 2016/0362160 A1 | 12/2016 | Van Druten et al. | |

FOREIGN PATENT DOCUMENTS

| | | | | |
|---|---|---|---|---|
| FR | 2782471 A1 * | 2/2000 | | B62K 25/02 |
| WO | WO-2011012773 A1 * | 2/2011 | | B62M 9/16 |

* cited by examiner

DRIVE ASSEMBLY FOR A BICYCLE

CROSS REFERENCE TO RELATED APPLICATIONS

This application is a continuation-in-part of and claims the benefit of co-pending U.S. patent application Ser. No. 15/711,586, filed Sep. 21, 2017, titled Assembly of Bicycle Frame, Cassette, and Wheel, the disclosure of which is hereby expressly incorporated by reference.

FIELD OF THE INVENTION

This invention relates in general to a chain drive assembly for powering the wheel of a bicycle, and more specifically involves a drive assembly for a bicycle wherein a cassette is easily modifiable and the wheel is easily removable and replaceable.

BACKGROUND OF THE INVENTION

The vast majority of conventional bicycles have a wheel hub that has an integral multi-sprocket cassette and is mounted on a "dead", i.e., non-rotating, axle having ends mounted in dropouts, i.e., a slot in the chainstays. A derailleur is moved to shift the chain among sprockets.

One shortcoming of the current construction is that removal of the wheel for repair or replacement is time-consuming and dirtying, mainly because the chain must be released from the cassette to remove the wheel and, upon mounting the wheel, the chain must be reattached to the same sprocket that it was on when the wheel was removed. This takes time, and, the rider must come into contact with the oily and dirty chain.

Another shortcoming of the current construction is that, if the fasteners retaining the dead axle in the dropouts are loosened, the axle can drop out of the dropouts and the rider will crash. Typically, for speed of removal, the fasteners are quick-release cam-levers that can be loosened by jarring or bumping. Also, they are easily mis-tightened in the first place, such that the axle slides from the dropouts.

Another shortcoming of the current construction is that the length of the cassette is limited by the spacing of the chainstays. Thus, it may not be spatially possible to have as many sprockets as desired.

SUMMARY OF THE INVENTION

The invention is a bicycle drive assembly and it generally includes a drive chain, a drive wheel including a wheel hub, a frame including left and right chainstays, each having a raced bearing, a cassette assembly, and an axle assembly.

In an exemplary embodiment, the wheel hub includes a central bore having left and right raced bearings and a freewheel mechanism. The chainstay bearings are separated by a gap for receiving the wheel hub. A derailleur, mounted on the frame, receives the chain. The cassette assembly includes an inner end rotatably mounted on the right chainstay bearing, an outer free end, and a central bore. The cassette includes a plurality of sprockets for receiving the chain for being rotated by the chain. Cassette, axle, and hub have cooperative torque-transferring components to transfer torque between the cassette assembly and the axle and between the axle and the hub.

The axle assembly includes a drive axle selectably movable axially between a riding position, wherein it is rotatably mounted on the chainstay bearings and supports and drives the wheel, and a release position wherein the wheel is removable.

The cassette may compromise multiple components, including a body portion and one or more sprockets. The body portion includes an inner end, rotatably mounted on the second chainstay bearing, and an outer free end. A sprocket includes an inner bore adapted for mounting on the body portion by threading onto the free end of the cassette assembly and an inner torque-transferring component cooperating with an outer torque-transferring component of the body to transfer torque to the body.

A preferred embodiment includes an axle securing mechanism in the form of resilient catch fingers and a push button selectively movable between a securing position securing the axle in the riding position and a release position wherein the axle is not secured in the riding position.

Other features and many attendant advantages of the invention will become more apparent upon a reading of the following detailed description together with the drawings wherein like reference numerals refer to like parts throughout.

DETAILED DESCRIPTION OF THE INVENTION

Figure 1:
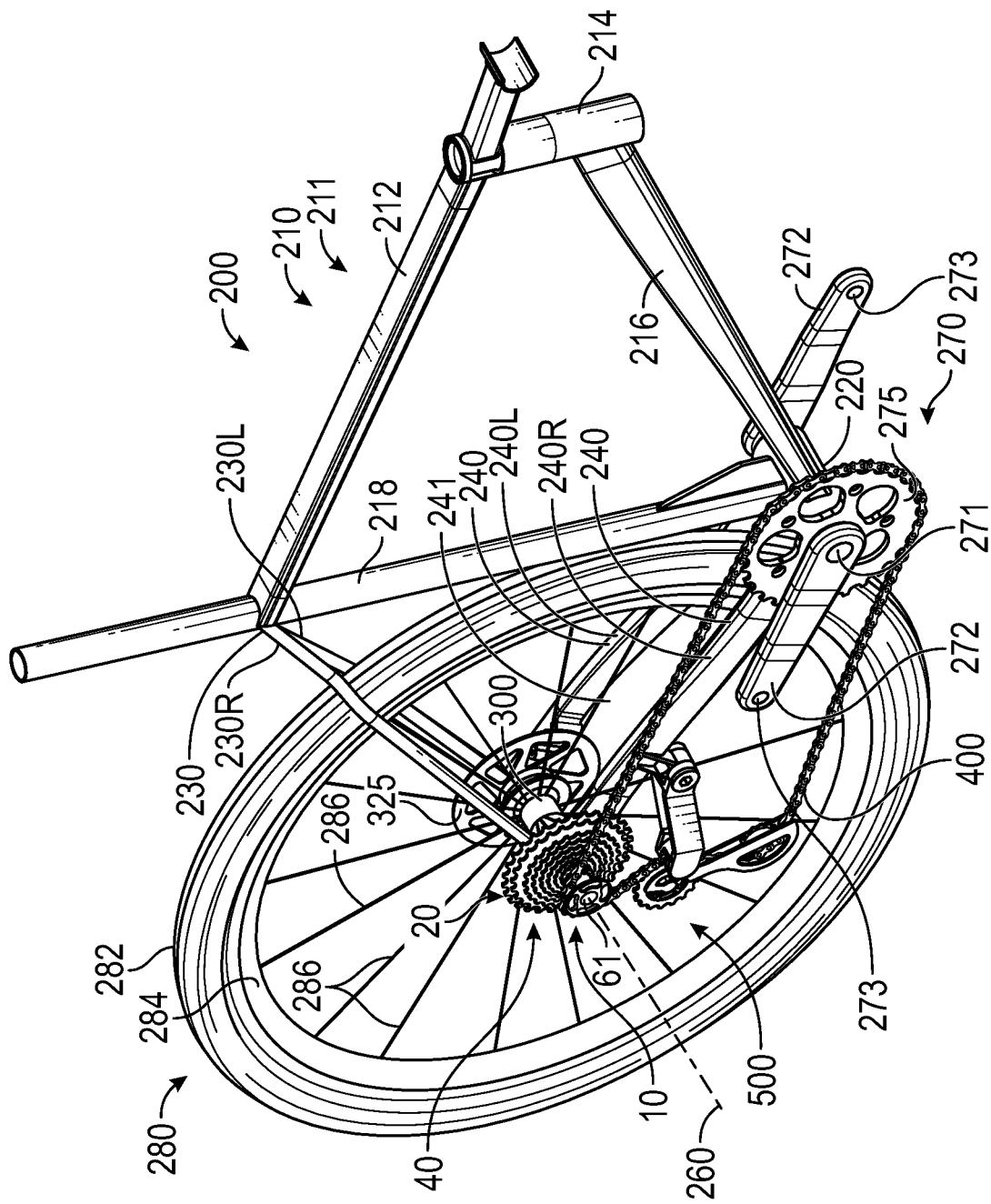
FIG. 1 is a front right-side perspective view of a portion of a bicycle including the drive assembly of the invention.
Figure 2:
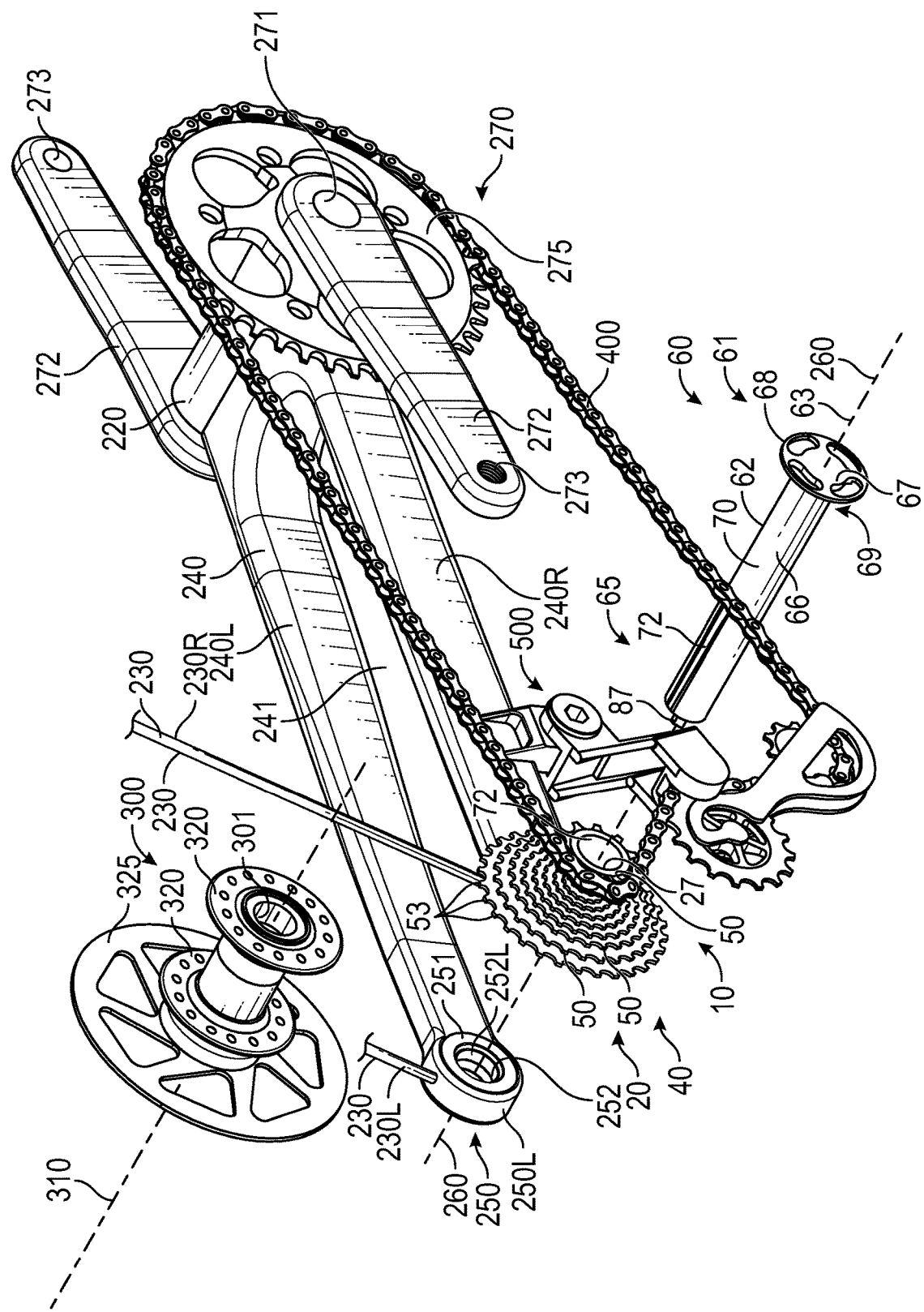
FIG. 2 is an enlarged back right-side perspective view of a portion of FIG. 1 showing the drive assembly partially exploded and wheel removed.

With reference now to FIGS. 1 and 2 of the drawings, FIG. 1 is front right-side perspective view of a portion of a bicycle 200 including the drive assembly 10 of the invention and a wheel 280. FIG. 2 is an enlarged back right-side perspective view of a portion of FIG. 1 showing drive assembly 10 partially exploded and drive wheel 280 removed.

Bicycle 200 generally includes a frame 210, crankset 270, wheel 280, chain 400, and derailleur 500. Frame 210 generally includes a main frame 211 including top tube 212, head tube 214, down tube 216, seat tube 218, and bottom bracket shell 220. Main frame 211 is generally rigid. In addition to mainframe 211, frame 210 further includes seatstays 230, chainstays 240, front forks, not shown, and handle bars, not shown.

Crankset 270, attached to frame 210, generally includes crankshaft 271, crank arms 272, and one or more chain rings 275. Crankshaft 271 is rotatably mounted in crank bearings, not visible, housed in bottom bracket shell 220. Each crank arm 272 has a threaded bore 273 for receiving pedals, not shown.

A flexible tension member loop, such as a toothed belt; cogged belt; synchronous belt or chain, such as roller chain 400, passes through derailleur 500, partially around chain ring 275 and partially around rear gear or sprocket 50 for driving sprocket 50 when chain ring 275 is turned. Although a drive chain 400 in the form of a metal roller bearing chain is shown, the term chain drive is used herein to include any form of flexible tension member that interacts with a sprocket 50 including these mentioned above. Derailleur 500 may be of a type known in the art manipulated by a rider such as by a cable and shift mechanism (not shown).

Drive wheel 280 includes tire 282 mounted on rim 284. Rim 284 is supported by rim support means, such as spokes 286 connected to wheel hub 300. As seen in FIG. 2, hub 300 is connected to a pair of flanges 320, which include attachment points for spokes 286 (seen in FIG. 1). Hub 300 may include one or more brake discs 325 for interaction with rear brake calipers, not shown, attached to frame 210. Hub 300 includes a central bore 301 having an axis 310.

FIG. 2 also better shows chainstays 240 of frame 210. Chainstays 240 include first or left chainstay 240L and second or cassette or right chainstay 240R projecting rearward from main frame 211, such as from bottom bracket shell 220, in a spaced relationship creating a wheel gap 241 (FIG. 1) for receiving wheel 280. Each chainstay 240L, 240R has a rear end including a bearing 250, such as first or left chainstay bearing 250L and second or cassette or right chainstay bearing 250R, which will be seen in FIGS. 4 and 5. Chainstay bearings 250L and 250R have a common bearing axis 260. The chainstay 240 to which a cassette assembly 20 is rotatably mounted, such as right chainstay 240R in the exemplary embodiment, is herein called the "cassette chainstay."

Seatstays 230 support the rear end of one or both chainstays 240 relative to main frame 211. Seatstays 230, as shown, comprise first or left seatstay 230L and second or right seatstay 230R. Seatstays 230L, 230R each have an upper end connected to main frame 211, such as to seat tube 218, and a lower end connected to the rear portion of chainstays 240L, 240R. Seatstays 230L, 230R are on opposite sides of wheel 280 and wheel gap 241. Seatstays 230 may be variable in length, such as including a shock absorber, as is well known in the art, in which case seatstays 230 are pivotally connected to main frame 211.

Cassette assembly 20 is rotatably mounted on the lateral side of cassette chainstay 240R, so as to be outside of wheel gap 241. Cassette assembly 20 includes cassette 40 including one or more sprockets 50 for receiving chain 400.

Axle assembly 60 includes an axle 61 having an elongate portion defining a longitudinal axis 63 and having an inner portion 65, central portion 66, and outer portion 69 terminating in an outer end 67 having a radial flange 68.

Figure 3:
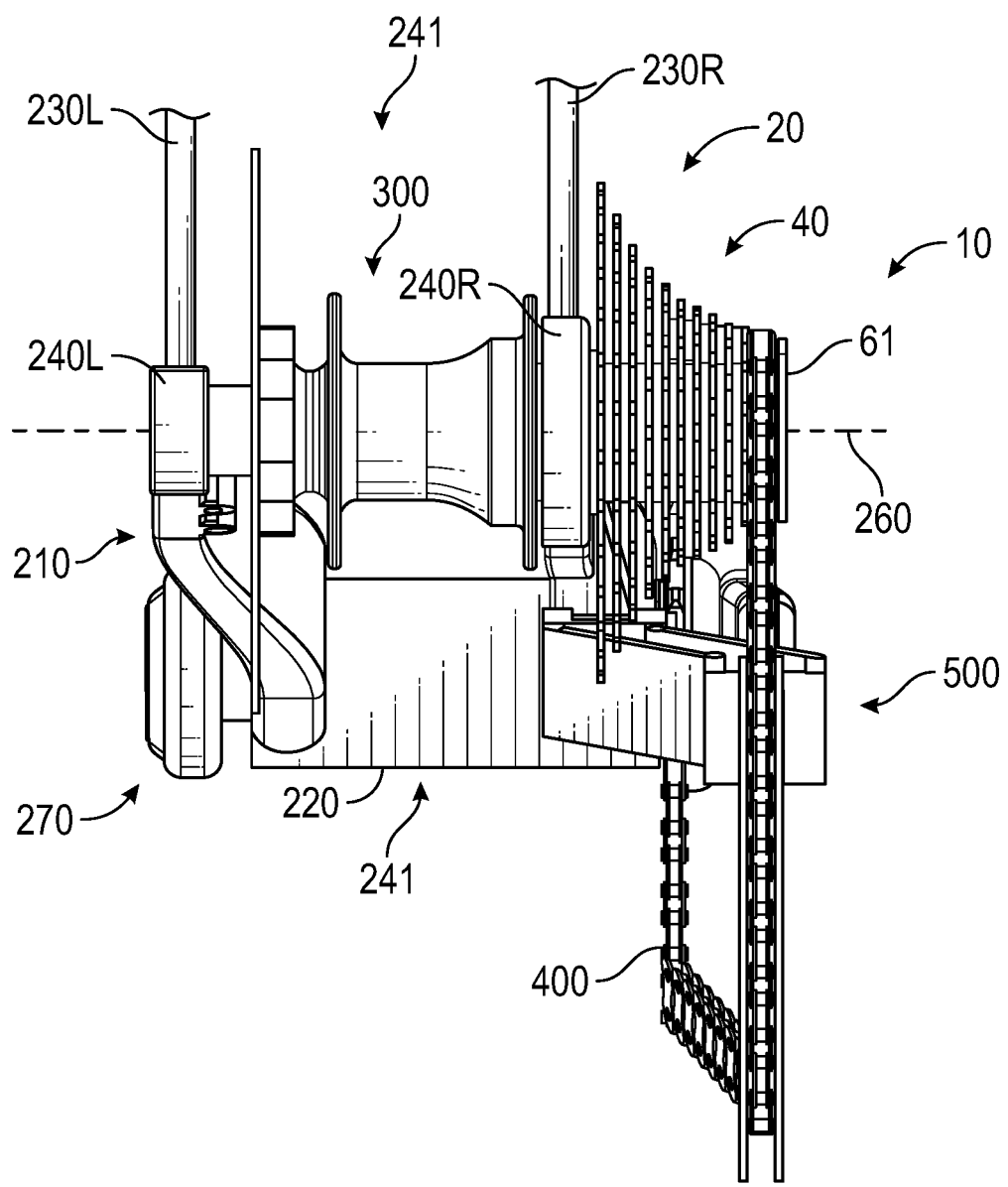
FIG. 3 is a rear elevation view of the drive assembly of FIG. 1, partially cut away, in position for riding.
Figure 4:
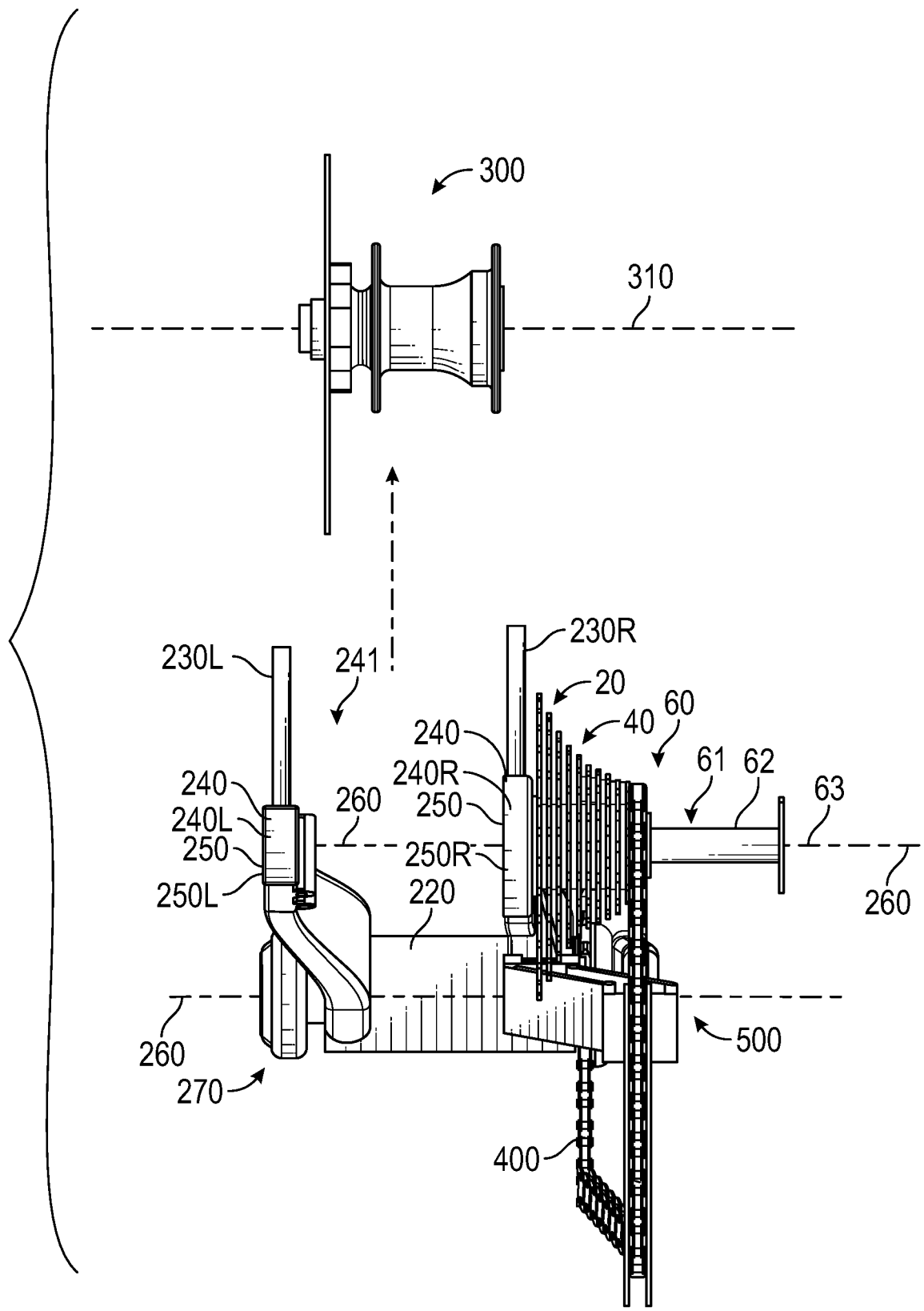
FIG. 4 is the view of FIG. 3 except with the axle partially withdrawn and wheel hub and wheel removed for clarity.
Figure 5:
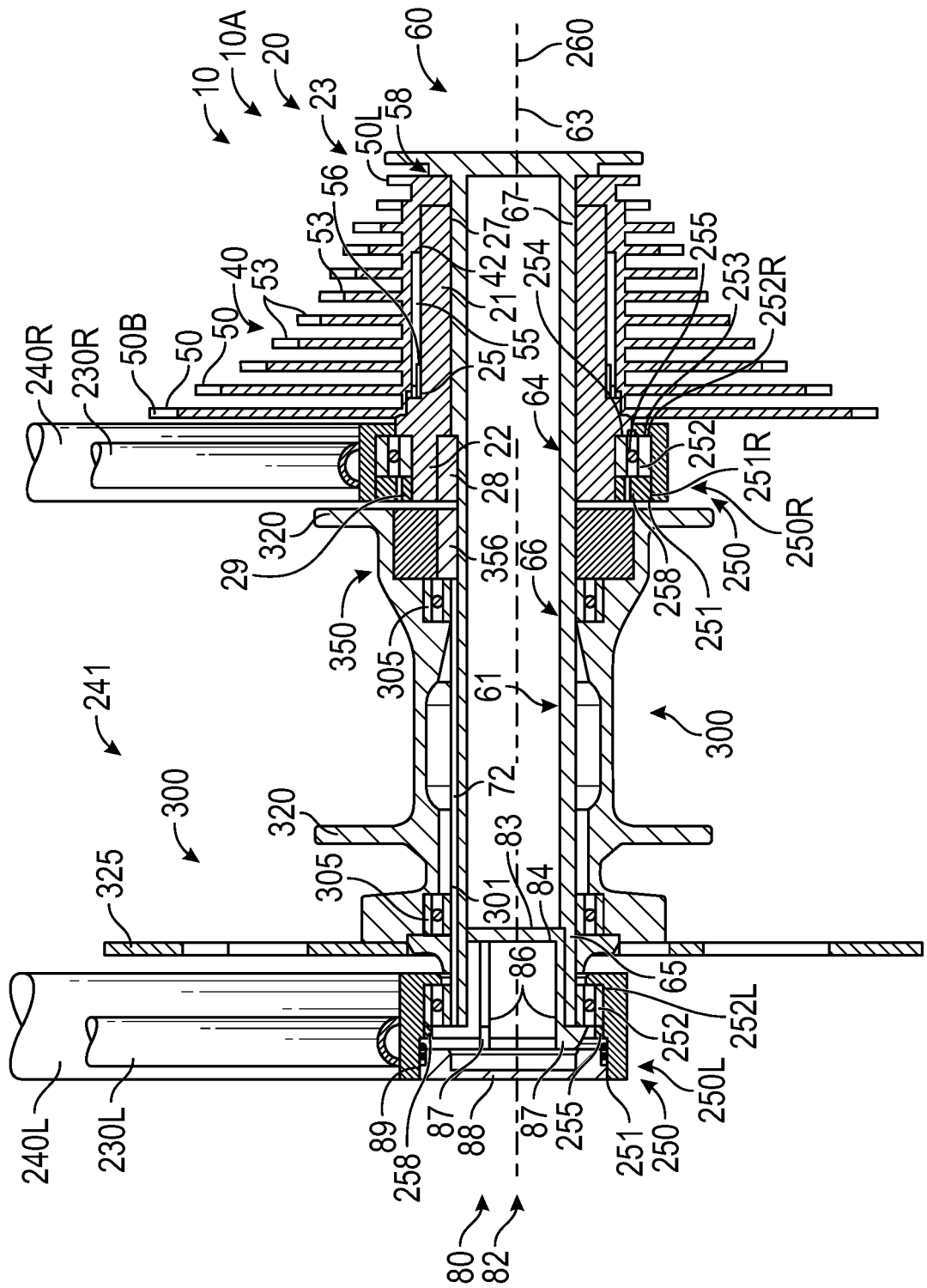
FIG. 5 is a vertical rear cross-sectional view taken on the bearing axis of FIG. 3 of a first embodiment of the drive assembly.

FIG. 3 is a rear elevation view of bicycle frame 210 including drive assembly with wheel hub 300 in riding position attached to chainstays 240L, 240R by axle 61. For clarity, the remainder of wheel 280 is not shown. FIG. 4 is the view of FIG. 3 except with drive assembly 10 shown in the wheel release position with axle 61 shown partially withdrawn so as to not engage hub 300, and wheel hub 300 is shown displaced upward. FIG. 5 is a vertical rear cross-section taken on the bearing axis 260 of FIG. 3 of a first embodiment 10A of drive assembly 10 in riding position.

In FIGS. 2-5, only hub 300 of wheel 280 is shown, it being understood that the remainder of wheel 280, such as spokes 286, is present and connected to hub 300. Axle 61 is movable axially between a riding position and a wheel release position. FIGS. 1, 3, and 5 show axle 61 in the riding position wherein it rotatably fastens wheel 280 to frame 210 by being disposed on central bearing axis 260 within cassette assembly 20, wheel hub bore 301, and chainstay bearings 250. Axle 61, in this position, can drive wheel 280. FIGS. 2 and 4 show axle 61 in the wheel release position wherein it has been moved axially horizontally to be clear of hub 300 such that wheel 280 is removable from gap 241, such as for repair or replacement. It can be seen that wheel 280 can be removed and replaced without disengaging chain 400 from cassette 40, which remains in its original position.

FIG. 5 illustrates a preferred embodiment 10A of drive assembly 10 and generally includes frame members including left and right chainstays 240L, 240R, wheel hub 300, cassette assembly 20, and axle assembly 60. Each chainstay 240L, 240R includes a bearing 250L, 250R for rotatably supporting axle 61. Many types of support bearing 250 are well-known in the art. In its simplest form, support bearing 250 could be the axle support surface of a through-bore in chainstay 240. In the exemplary embodiment, each support bearing 250 includes a raced bearing 252, such as first or left raced bearing 252L, seen in FIG. 2, and second or cassette or right raced bearing 252R.

Raced bearings 252 are well known in the art. Raced bearing 252 has an outer race 253, supported in bore 251 in chainstay 240 and an inner race 254 rotatably supported by roller elements 255 located between races 253, 254. Raced bearing 252 is secured to the remainder of chainstay 240 by internal circlip 258, but could be secured by a press fit or any other suitable means as are known in the art.

Cassette assemblies, such as cassette assembly 20, are well known in the art and have many different configurations, size and number of sprockets, and means of assembly. The following description of an exemplary embodiment is intended to describe differences and advantages of the claimed invention. Cassette assembly 20 is rotatably mounted to bearing 250R outside of, i.e. to the right of, cassette chainstay 240R. Cassette assembly 20, in general, includes a body 21 and cassette 40. For the most part, cassette body 21 is a cylindrical tube having a central bore 27 for receiving axle 61 and having an inner end 22 and an outer free end 58. Inner end 22 is rotatably mounted to cassette chainstay bearing 250R. In the depicted embodiment, inner end 22 is disposed in inner race 254 of raced bearing 253R by means such as external circlip 29 disposed medial of inner race 254 of bearing 250R. Inner end 22 could be mounted in other desirable manners. For example, cassette body 21 could be shaped for medial insertion through bore 250R and have an end flange, not shown, for bearing against inner race 254 of raced bearing 252R to prevent further insertion and then be further retained by attachment of cassette 40 or by attachment of axle 61. Or inner end 22 could be attached to the lateral side of inner race 254 of bearing 252R, such as by welding.

Cassette 40 includes one or more sprockets 50. Teeth 53 on the outer periphery of each sprocket 50 couple to chain 400 to be driven by chain 400. Sprockets 50 have an inner bore 42. A plurality of sprockets 50 cascade in diameter from the biggest sprocket 50B, typically nearest chainstay 240R, down to the littlest sprocket 50L, typically toward outer or free end 58 of cassette assembly 20. Sprockets 50 may be individual, may be integral as a sprocket set, or may be mixed, such as with the bigger sprockets 50 being integral and other sprockets, such as the littlest sprocket 50L, being individual. Cassette is mounted to body 21 from outside frame 210. Preferably, cassette 40 is coupled to body 21 in a manner so as to be able to drive body 21 and yet so as to be easily removable so as to be replaced with a different cassette 40 having different sizes of sprockets 50 or a different number of sprockets 50. To this end, cassette 40 and body 21 include cooperative torque-transferring means, such as torque-transferring components, such as splines 56 on inner bore 55 for mounting on and transferring torque to splines 25 on outer surface of body 21. In this configuration, cassette 40 is held in place by axle 61. Alternatively, cassette 40 could be more permanently attached to body 21 in any desirable manner, such as with mating threads or by a nut, not shown, threaded on the outer end 23 of body 21.

Cassette assembly 20 and axle assembly 60 include cooperating torque-transferring components, such as one or more splines or keys 28 on inner end 22 of body 21, engaging a torque-transferring component, such as splines or a keyway 72 on axle 61. Many types of cooperating torque-transferring components are known and include geometrical engagement, such axle 61 being a polygon in transverse cross-section cooperating with a mating shape to protrusions on the other component. For example, a triangular axle with rounded lobes would work.

Cassette assembly 20 is shown and described as having multiple components for ease of manufacturing and assembly and for changing the number and size of sprockets 50. However, cassette assembly 20 could be manufactured as of one component.

Wheel hub 300 has a central bore 301 including bearings 305 defining a central hub axis 310 (FIG. 4) that is co-axial with frame bearing axis 260 when wheel 280 is mounted on frame 210. Bearings 305 could be of any suitable type, such as raced bearings having outer and inner races rotatably supported by roller elements located between the races. Bearings 305 mount hub 300 on axle 61 such that hub 300 can rotate on axle 61. A pair of radial flanges 320 attach to inner ends of spokes 286. Disc 325 for a disc brake is optional.

Axle 61 and hub 300 include cooperating torque-transferring components, such as an overrunning clutch, or unidirectional clutch or freewheel mechanism 350, as is well known in the art. Freewheel mechanism may include one or more ratchet teeth or keyways or biased pawls 356, engaging cooperating pawls or teeth or keyways 72 on axle 61. Any other suitable freewheel mechanism may be used, such as a design using spring-biased steel rollers inside a driven cylinder. Rotating in one direction, the rollers lock with the cylinder making it rotate in unison. Rotating slower, or in the other direction, the steel rollers just slip inside the cylinder. Freewheel mechanism 350 allows wheel 280 to freely rotate forward when torque is not being transferred from axle 61 to hub 300. This allows the bicycle to coast when wheel 280 is turning faster than axle 61. One or more spacers, not shown, laterally position hub 300 between chainstays 240L, 240R. Blind slots (not shown) in inner faces of chainstays 240 provide a channel for travel of the lateral spacers so as to position hub 300 with central bore 301 aligned with bearing axis 260.

Axle assembly 60 generally includes axle 61 and axle securing mechanism 80 selectively movable between a securing position, wherein axle 61 is secured in a riding position, and a release position, wherein axle 61 is not secured in the riding position. In general, axle 61 includes an elongate portion 62, such as a shaft or cylinder, having a longitudinal axis 63. Elongate portion 62 rotatably supports wheel hub 300 on chainstays 240. Axle 61 mounts wheel hub 300 to frame 210 and rotates with cassette assembly 20 and drives wheel hub 300 when wheel hub 300 is not freewheeling. Axle 61 includes an inner bore 64, a left or inner portion 65, a central portion 66, an outer portion 69 (FIG. 2) having a right or outer end 67, and an outer surface 70 including one or more torque-transferring components, such as splines of a key way 72, for receiving torque from key 28 of cassette assembly 20 and for transferring torque to key 356 of freewheel mechanism 350. Many types of cooperating torque-transferring components are known and include geometrical engagement, such axle 61 being a polygon in transverse cross-section. For example, axle 61 with triangular cross section with rounded vertices, corners, or lobes, not shown, could be used. A polygonal axle with slightly tapered inner end 65 is self aligning with the components transferring torque to axle 61.

To mount wheel 280 to chainstays 240, inner portion 65 of axle 61 is inserted on bearing axis 260 through central bore 27 of cassette assembly 20, right chainstay raced bearing 252R, central bore 301 of wheel hub 300, and into left chainstay raced bearing 252L so as to be rotatably supported thereby. Central portion 66 of axle 61 is rotatably supported by second frame bearing 250R, either directly or indirectly through cassette assembly 20, such as through body 21 that is mounted inside of bearing 250R, as shown. Flange 68 on axle outer end 67 may bear against cassette assembly 20. In doing this, keyway 72 is aligned with keys or pawls 28, 356. Axle 61 may be secured from withdrawal with any desirable securing mechanism 80, such as a threaded nut or a C-clip, not shown, fastened to axle 61 and bearing against frame 210, such as against outer side of inner race 254 of raced chainstay bearing 252L. In the exemplary embodiment, axle securing mechanism 80 is a finger-activated quick-release fastener 82. Quick-release 82 includes a plug 83 having an inner end 84 fastened within axle inner bore 64 by any desired means, such as threading or a press fit. Plug 83 has a plurality of resilient fingers 86 having inner ends attached to plug inner end 84 and free ends including barbs 87. Fingers 86 are resiliently biased to spread radially outward such that barbs 87 engage the left or outer side of inner race 254 of left raced bearing 252L to secure axle 61. Three fingers 86 spaced at 120 degrees apart, such as at 60, 180, and 300 degrees, are shown. A push button 88 and spring 89 are mounted in left chainstay bore 250L such that push button 88 is axially slidable and outwardly biased by spring 89. Push button 88 and barbs 87 are cooperatively configured such that, as push button 88 is pushed inward it retracts barbs 87 from bearing 2521L to release axle 61. Axle 61 can then be pulled axially to the right until axle 61 is clear of wheel gap 241.

To remove wheel 280, one can simply press button 88 and pull axially on flange 68 until axle inner portion 65 is clear of gap 241 as seen in FIG. 4. Axle inner portion 65 resides within central bore 27 of cassette assembly 20 and is retained there, such as by general friction between axle 61 and cassette assembly 20 or such as by friction from finger barbs 87. Thus, wheel 280 can be removed and replaced without completely disengaging axle assembly 60 from cassette assembly 20 or disengaging chain 400 from cassette 40.

An outer raced bearing, not shown, may be mounted between outer end 23 of cassette assembly 20 and axle 61 to provide greater strength.

Figure 6:
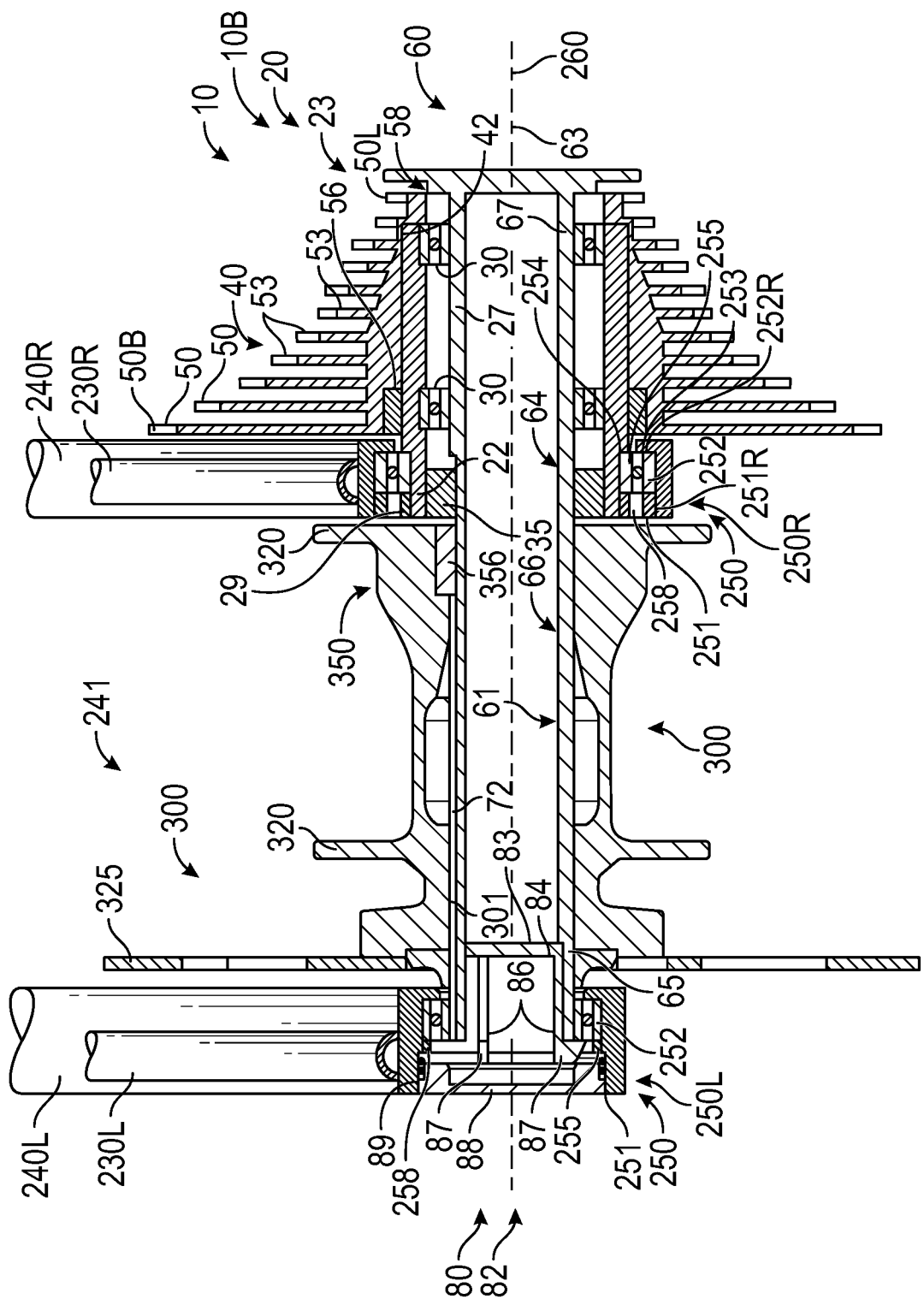
FIG. 6 is a vertical rear cross-sectional view taken on the bearing axis of FIG. 3 of a second embodiment of the drive assembly.
Figure 7:
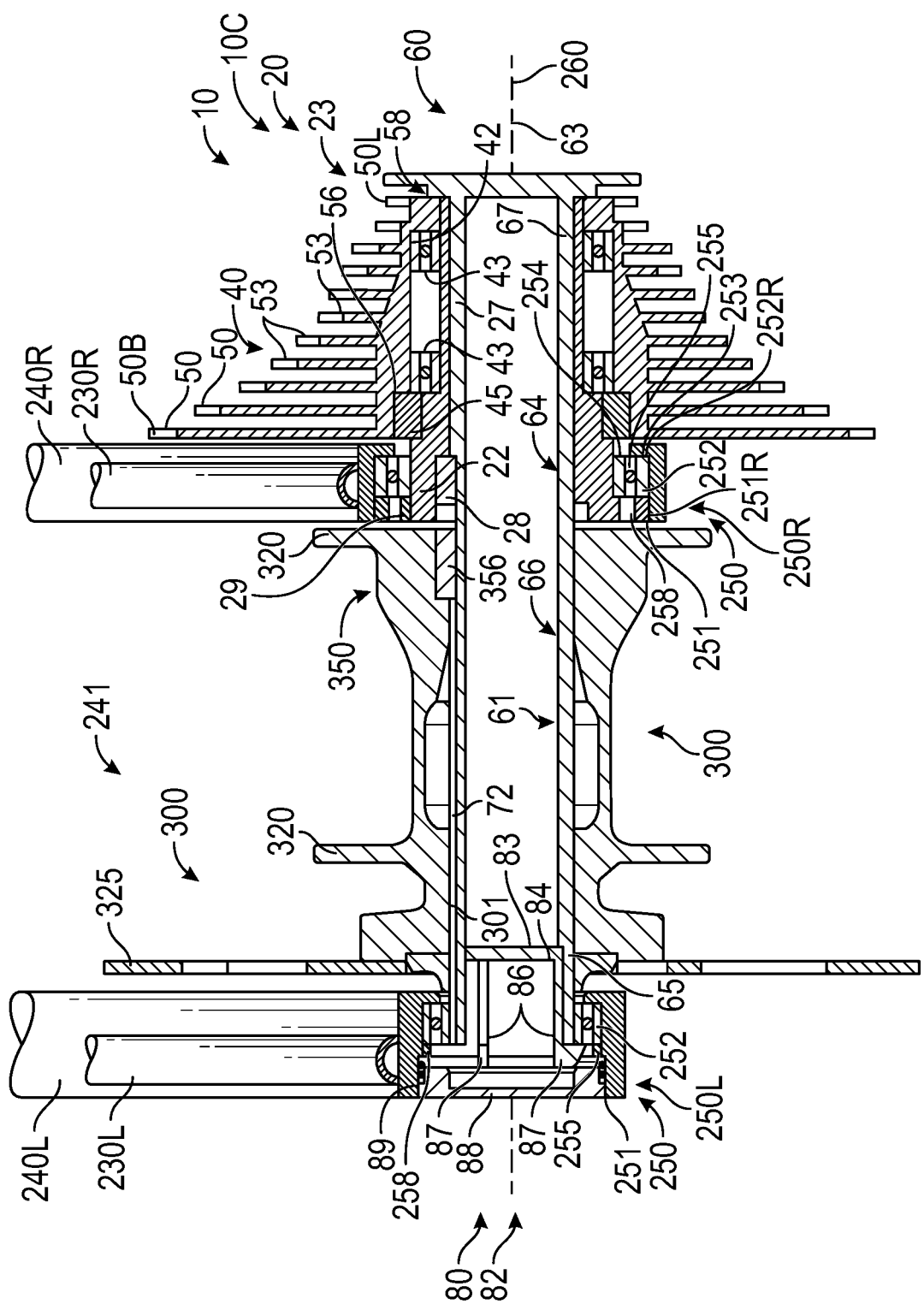
FIG. 7 is a vertical rear cross-sectional view taken on the bearing axis of FIG. 3 of a third embodiment of the drive assembly.

FIGS. 5, 6, and 7 are illustrate different exemplary embodiments of drive assembly 10, and they more particularly depict different placements of a freewheel mechanism, such as hub freewheel mechanism 350, body freewheel mechanism 35, and cassette freewheel mechanism 45, that allow bicycle 200 to coast.

FIG. 6 is a vertical rear cross-section taken on the bearing axis of FIG. 3 of a second embodiment 10B of the drive assembly 10 on the bearing axis 260 of FIG. 3. Drive Assembly 10B differs from drive assembly 10A primarily in that a freewheel mechanism 35 is disposed between cassette assembly 20 and axle 61. Central bore 27 of body 21 includes one or more bearings, such as a pair of raced bearings 30 shown, for rotatably supporting axle 61. Bearings 30 of cassette assembly 20 have an axis coaxial with frame bearing axis 260. As shown, axle 61 is rotatably supported by cassette bearing 30 and ultimately by frame bearing 252R. Freewheel mechanism 35 performs the same type of functions as discussed above in relation to hub freewheel 350 and it transfers driving torque from body 21 to axle 61 yet allows axle 61 and hub 300 to rotate when torque is not being transferred. These parts can be arranged in many configurations to achieve similar results, and it is intended to cover in the appended claims such modifications. For example, axle 61 could be directly rotatably supported by bearing 252R, in which case, bearings 30 would not be necessary.

FIG. 7 is a vertical rear cross-sectional view taken on the bearing axis of FIG. 3 of a third embodiment 10C of the drive assembly on the bearing axis of FIG. 3. Drive Assembly 10C differs from drive assembly 10B primarily in that a freewheel mechanism 45 is disposed between cassette 40 and body 21. Inner bore 42 of cassette 40 includes one or more bearings, such as a pair of raced bearings 43, shown, for rotatably supporting cassette 40 on body 21. Bearings 43 of cassette 40 have an axis coaxial with frame bearing axis 260. Axle 61 is rotatably supported ultimately by frame bearing 252R, the same as the configuration of FIG. 5. Freewheel mechanism 45 performs the same type of functions as discussed with hub freewheels 350, 35, and it transfers driving torque from cassette 40 to body 21 but allows body 21, axle 61, and hub 300 to rotate when torque is not being transferred, so the bicycle can coast. These parts can be arranged in many configurations to achieve similar results, and it is intended to cover in the appended claims such modifications.

The invention offers several advantages over conventional bicycle drives. One is the quick and easy removal of wheel 280 for any reason, such as for replacement or repair. This advantage is enhanced in that no tools are needed and no elements, other than the wheel 280, need be completely separated from the other elements. Thus, there are no removed parts to be lost. Chain 400 simply remains where it was, whereas with conventional drives while removing and mounting wheel 280, chain 400 must be detached from sprocket 50 and then re-attached to the same sprocket 50.

Another advantage is the longitudinal width of cassette 40 is not restricted, as is the longitudinal width of a conventional cassette in its placement between chainstays 240. Cassette 40 can vary in width such that a greater number of sprockets 50 or thicker sprockets 50 can be used.

Another advantage of the invention is that wheel 280 is more securely attached to frame 210 than when a conventional drive assembly is used. With the invention, axle 61 is a "live" axle, that is, it is a drive axle and it is disposed in frame bearings 252 such that wheel 280 cannot be removed from frame 210 without withdrawal of axle 61 from bearings 252. Wheels 280 on most conventional bicycles mount to the frame with a "dead" axle, that is, a non-drive axle, that is mounted in slots or drop outs in the frame. The axle is tensioned by a quick release lever to hold it in the drop outs. Should the tension be released, such as because the release lever was bumped or the chainstays were pushed momentarily closer together, the wheel can come loose from the frame. This could be catastrophic in some situations, such as on a bumpy downhill.

Another advantage the invention is that cassette 40 and chain 400 are more accessible for cleaning and lubrication.

Although a particular embodiment of the invention has been illustrated and described, various changes may be made in the form, composition, construction, and arrangement of the parts herein without sacrificing any of its advantages. Therefore, it is to be understood that all matter herein is to be interpreted as illustrative and not in any limiting sense, and it is intended to cover in the appended claims such modifications as come within the true spirit and scope of the invention. For example, although the torque-transferring components shown mainly comprise splines or keys and slots, many cooperating torque-transferring components are known in the art that would be suitable, and, although a single keyway 72 is shown in axle 61, axle 61 could have multiple keyways 72.

I claim:
1. A bicycle including:
   a drive chain;
   a drive wheel including:
      a hub having:
         a central bore having an axis;
   a frame including:
      a first chainstay including:
         a bearing; and
      a second chainstay including;
         a bearing; said chainstay bearings having a central bearing axis and being separated by a gap for co-axially receiving said wheel hub;
   a cassette assembly including:
      an inner end rotatably mounted outside of the gap on said second chainstay bearing;
      a central bore having an axis co-axial with the central bearing axis; and
      a cassette including:
         a plurality of sprockets; one sprocket of said sprockets of said cassette receiving said chain for being rotated by said chain; and
   an axle assembly including:
      a drive axle including:
         an elongate portion having a longitudinal axis and including:
            an inner portion;
            a central portion; and
            an outer portion; said cassette assembly and said axle including cooperating torque-transferring components, and said axle and said hub including cooperating torque-transferring components including a freewheel mechanism; and wherein said axle is selectably movable axially between;
      a riding position wherein:
         said axle inner portion is rotatably supported by said first chainstay;
         said axle central portion is rotatably supported by said second chainstay bearing;
         said axle rotatably supports said hub between said chainstay bearings;
         said cooperating torque-transferring components of said cassette assembly and said axle transfer torque to said axle; and said cooperating torque-transferring components of said axle and hub transfer torque to said hub; and
a wheel release position wherein:
said axle inner portion is disposed within said central bore of said cassette assembly; and
said hub is not supported by said axle, such that said wheel is removable from the gap between said chainstays.

2. The bicycle of claim 1 further including:
a securing mechanism selectively movable between a securing position securing said axle in the riding position and a release position wherein said axle is not secured in the riding position.

* * * * *